United States Patent [19]
Kreuder et al.

[11] Patent Number: 6,107,447
[45] Date of Patent: Aug. 22, 2000

[54] CHOLESTERIC PHASE-FORMING POLYMERS, PROCESS FOR THEIR PREPARATION AND THEIR USE

[75] Inventors: Willi Kreuder, Mainz; Axel Schönfeld, Wiesbaden, both of Germany; Gordon Calundann, Short Hills, N.J.

[73] Assignee: Hoechst Research Technology Deutchland GmbH & Co. KG, Frankfurt, Germany

[21] Appl. No.: 09/051,608

[22] PCT Filed: Oct. 18, 1996

[86] PCT No.: PCT/EP96/04549

§ 371 Date: Jun. 16, 1998

§ 102(e) Date: Jun. 16, 1998

[87] PCT Pub. No.: WO97/14739

PCT Pub. Date: Apr. 24, 1997

[30] Foreign Application Priority Data

Oct. 18, 1995 [DE] Germany .............................. 195 38 700

[51] Int. Cl.[7] ...................... C08G 63/197; C08G 63/193; C08G 63/672; C08G 63/44
[52] U.S. Cl. ........................... 528/310; 528/176; 528/190; 528/193; 528/195; 528/272; 528/288; 528/289; 528/322; 428/1; 428/357; 428/394; 428/395; 428/480
[58] Field of Search ..................................... 528/195, 176, 528/190, 193, 310, 272, 288, 289, 322; 428/1, 357, 394, 395, 480

[56] References Cited

U.S. PATENT DOCUMENTS 4,891,418  1/1990  Hara et al. ................................ 528/195
5,766,679  6/1998  Siemensmeyer et al. ........... 427/207.1

FOREIGN PATENT DOCUMENTS 0391368  10/1990  European Pat. Off. .
WO 96/25449  8/1996  WIPO .

OTHER PUBLICATIONS

Kricheldorf et al., Macromolecular Rapid Com., vol. 16, No. 4, 1995, pp. 231–237.
Braun et al., Applied Macromolecular Chemistry and Physics, vol. 210, Aug. 1993, pp. 173–196.
Storbeck et al., Makromol. Chem., vol. 194, 1993, pp. 53–64.

*Primary Examiner*—P. Hampton-Hightower
*Attorney, Agent, or Firm*—Frommer Lawrence & Haug LLP

[57] ABSTRACT

The invention relates to polymers which form cholesteric phases, to a process for their preparation and to their use.

Novel polymers and oligomers which form cholesteric phases essentially consist, as molecular building blocks, of A. at least one bifunctional chiral molecular building block which contains at least one cyclic structural element other than a monosubstituted p-phenylene group, B. at least one bifunctional achiral or racemic molecular building block which contains at least one cyclic structural element containing at least four ring members, and C. at least one bifunctional molecular building block which can be either chiral or achiral, cyclic or acyclic, and is different from the molecular building blocks A and B actually employed, with the proviso that the molecular building block A is not derived exclusively from camphoric acid.

20 Claims, No Drawings

CHOLESTERIC PHASE-FORMING POLYMERS, PROCESS FOR THEIR PREPARATION AND THEIR USE

The invention is in the area of liquid-crystalline, macromolecular compounds. In particular, the invention relates to polymers and oligomers which are capable of forming cholesteric phases. In addition, the invention indicates advantageous processes for the preparation of such substances. In addition, the invention also relates to the use of cholesteric polymers and oligomers.

It is known that molecules which are anisotropic in shape can form liquid-crystalline phases, known as mesophases (from the Greek meso=in between, meaning between an isotropic liquid and an anisotropic crystal), on warming. Molecules which are anisotropic in shape are therefore also referred to as mesogens (adj.=mesogenic); in particular, the term mesogen denotes the rigid moiety without the wing groups usually attached to the ends thereof in low-molecular-weight liquid-crystal molecules or flexible spacer segments in semiflexible liquid-crystalline main-chain polymers. The individual mesophases differ through the spatial arrangement of the major parts of the molecules on the one hand and through the molecular arrangement with respect to the long axes on the other hand (G. W. Gray, P. A. Winsor, Liquid Crystals and Plastic Crystals, Ellis Horwood Limited, Chichester, 1974). The nematic liquid-crystalline phase is distinguished by the fact that there is only one alignment long-distance ordering due to the long molecular axes lining up in parallel. Under the prerequisite that the molecules making up the nematic phase are chiral, a so-called cholesteric phase forms, in which the long axes of the molecules form a helical superstructure perpendicular thereto (H. Baessler, Festkörperprobleme XI, 1971). The chiral moiety may either be present in the liquid-crystalline molecule itself or added to the nematic phase as a dopant. Phases produced by doping are referred to as induced cholesteric phases. This phenomenon was first studied on cholesterol derivatives (H. Baessler, M. M. Labes, J. Chem. Phys. 52 (1970) 631; H. Baessler, T. M. Laronge, M. M. Labes, J. Chem. Phys. 51 (1969) 3213; H. Finkelmann, H. Stegemeyer, Z. Naturforschg. 28a (1973) 799). The induction of cholesteric phases later also became possible through addition of other chiral substances which are not themselves liquid-crystalline (H. Stegemeyer, K. J. Mainusch, Naturwiss. 58 (1971) 599; H. Finkelmann, H. Stegemeyer, Ber. Bunsenges. Phys. Chem. 78 (1974) 869).

The cholesteric phase has remarkable optical properties, namely large optical rotation and pronounced circular dichroism caused by selective reflection of circular-polarized light within the cholesteric phase. The different colors observed depending on the viewing angle depend on the pitch of the helical superstructure, which is itself dependent on the twisting power of the chiral component. The pitch and thus the wavelength range of the light selectively reflected by a cholesteric phase can be varied, in particular, by changing the concentration of a chiral dopant (J. E. Adams, W. E. L. Haas, Mol. Cryst. Liq. Cryst. 16 (1972) 33).

Such cholesteric systems offer interesting opportunities for practical use.

For more details on the prior art, the following documents and publications are also mentioned:
D1=U.S. Pat. No. 4,410,570;
D2=DE 42 40 743 A1;
D3=EP-A-0 358 208;
D4=EP-A-0 383 376;
D5=DE 43 42 280 A1;
D6=J. Watanabe, W. R. Krigbaum, J. Polym. Sci., Polym. Phys. Ed. 23 (1985), 565–574;
D7=a) M. Ballauf et al., Makromol. Chem., 194 (1993) 53–64
b) M. Ballauf et al., Polymer 34 (1993) 5003–6;
D8=H. G. Elias, Makromoleküle, 5th Edn., Hüthig und Wepf Verlag, Basle, 1990, pp. 779, 780; and
D9=jP-A-6-186534.

D1 describes cyclosiloxanes which form cholesteric phases and which can carry side chains which can be categorized in three groups. Firstly, the side chains are conventional (monofunctional) side-chain mesogens. However, (mesogenic) cholesteryl esters are also discussed as side chains. Finally, (mesogenic) vinyl derivatives which are polymerizable and consequently crosslinkable are presented. The cholesteric siloxanes in D1 exhibit a strong temperature dependence of the reflection color, which is utilized in thermography (for example mammography). For most applications, however, this temperature dependence of the reflection color is undesired.

D2 discloses pigments whose color depends on the viewing angle. The pigments consist of aligned, three-dimensionally crosslinked substances having a liquid-crystalline structure with a chiral phase, which can, if desired, be in the form of a mixture with further dyes and pigments. The three-dimensionally crosslinkable liquid-crystalline substances having a chiral phase are cholesteric liquid crystals containing polymerizable, polycondensable or polyaddition-capable groups, of which at least some are in the form of di-, tri- or polyfunctional units. The preferred substances mentioned in D2 are three-dimensionally crosslinkable polyorganosiloxanes, as are, for example, the subject-matter of D3. As representative of this class of compound, D2 mentions, for example, a polyorganosiloxane containing methacryloyl-containing side chains which is prepared from cholesteryl 4-(prop-2-en-1-oxy)benzoate, 4-trimethylsiloxyphenyl 4-(prop-2-en-1-oxy)benzoate and tetramethylcyclotetrasiloxane using dicyclopentadieneplatinum dichloride followed by reaction with p-toluenesulfonic acid and methacrylic anhydride.

The problem existing for the substances of D1 is solved by D2 by a very demanding treatment, which is difficult to carry out and in some cases also appears quite complex, of the material disclosed in D1 which has vinylic side groups. In particular, the material obtained in the treatment of D2 is fixed in a non-equilibrium state by three-dimensional crosslinking. This is the cause of a number of disadvantages. The crosslinked material can no longer be reshaped, and it swells in most solvents, reversibly or irreversibly losing its properties. The swollen materials are mechanically sensitive, especially in the form of flakes or pigments, and are adversely affected by shear forces.

The corresponding situation applies to specific embodiments in D4 based on the same cholesteric siloxanes.

Polymerizable, chiral compounds are also disclosed in D5, which discloses chiral compounds containing at least one bidentate or polydentate chiral group, at least one polymerizable group, at least one spacer and at least one mesogenic group. The compounds claimed by D5 serve as polymerizable, chiral dopants for the production of cholesteric networks and are suitable for use in electro-optical displays or as chiral dopants for nematic or cholesteric liquid crystals for producing layers which reflect in color.

In order to obtain cholesteric polymers with sufficiently heat-stable selective reflection from the "monomers" disclosed in D5, three-dimensional crosslinking is essential. The resultant polymers which form cholesteric phases are therefore afflicted with precisely the same disadvantages as the polymers disclosed in D2.

In addition to the difficulties in connection with providing suitable pigments, there are further problems in processing liquid-crystalline main-chain polymers in general. This is because economic importance is attached, inter alia, to the use of liquid crystal polymers (LCPs) comprising so-called rigid or semiflexible (worm-like) main-chain polymers. These generally have a nematic LC phase and are generally processed from the melt, for example by injection molding or extrusion. The nematic state offers advantages in thermoplastic processing over non-LC thermoplastics, since the molecules align in parallel in the flow field, reducing the apparent viscosity. This advantageously results in lower injection and hold pressures and/or shorter cycle times in the shaping and processing operation.

However, the pronounced anisotropy also leads to disadvantages in the material properties, which result from the (crystalline) material solidifying with the nematic texture of the melt. Although this is evident in very good tensile strength in the machine direction, fibrous fracture, similar to splintering wood, occurs very easily transversely thereto. There has been no lack of attempts to overcome this disadvantage, for example by means of complex injection-molding processes, in particular double gate or even triple gate injection, in which it is attempted, through deliberate swirling of the melt, to reduce these unfavorable anisotropy effects. It is nevertheless very desirable also to be able to process the known main-chain LCPs by less complex processes without having to accept the disadvantages of the anisotropic material properties.

Certain compounds prepared using chiral units are already known from the literature, but the person skilled in the art is not given a clear technical teaching nor is the utility of the specific compound disclosed.

D6 describes homopolyesters and copolyesters made from chiral (+)-3-methyladipic acid, azelaic acid and 4,4'-biphenol. The disclosed compounds themselves have a number of disadvantages. The long aliphatic, chiral spacer is unsuitable owing to its thermal lability and tendency to racemize. Problems occur even during preparation of such polyesters through poor thermal stability and sublimation. This can have a number of causes. Firstly, the free acid, its cyclic anhydride or the corresponding cyclic ketone can sublime. The same phenomenon can in turn result, during thermoplastic processing, in uncontrollable changes to the material parameters. In addition, it is generally known that long alkylene segments of this type tend toward significant autoxidation phenomena even at temperatures of 200° C., which, although reduced by (complex) inert-gas atmosphere techniques, cannot, however, be entirely avoided. At temperatures above about 300° C., decomposition occurs even under an inert-gas atmosphere. Both problems considerably restrict the technical utility.

Furthermore, one of the components, namely methyladipic acid, is difficult to obtain. All this, together with excessive solubility of the polyester in organic media, stands in the way of industrial use.

Ballauff et al. described in 1993 (D7) the homopolyesters of 1,4:3,6-dianhydrohexitol with terephthalic acid. Cholesteric phases are not reported, although this would generally be evident from iridescent colors even without auxiliaries. Ballauff et al. cite Thiem (J. Theim, H. Lüders, Starch, 36, 170–176 (1984)), who had already described such terephthalates, again without mentioning a cholesteric phase or even a particular optical phenomena of any type.

It is furthermore disclosed by D8 (H. G. Elias, Makromoleküle [Macromolecules], 5th Edn., Hüthig und Wepf Verlag, Basle, 1990, pp. 779, 780) that cholesteric mesogens are formed by introducing small amounts of chiral comonomers into LC polymers, for example by cocondensation of small amounts of valine $H_2N$—$CH(CH(CH_3)_2)$—COOH with p-aminobenzoic acid. However, poly(p-amino acid) only forms LC phases in the presence of solvents, such as HMPT, sulfuric acid or methylsulfonic acid, ie. they belong to the group of lyotropic mesophases (from the Greek lyos=dissolve), which means that industrially relevant thermotropic behavior (ie. without the presence of a solvent, ie. also in a crystalline solid having an LC structure) can be excluded, as known to the person skilled in the art.

The same citation states that addition of optically active compounds to lyotropic nematic mesophases likewise gives cholesteric mesophases, for example addition of (+)-1-methylcyclohexanone to solutions of poly-p-benzamide. However, this effect of inducing a chiral lyotropic phase can only be observed in the presence of a solvent, which means that the industrial utility is extremely low. No phenomena occur in solids, due to the chiral structure of the polymer.

However, the principle of induction of cholesteric phases by chiral comonomers or (non-chemically bonded) dopants has hitherto received no attention in the case of predominantly rigid, thermotropic main-chain polymers.

This is presumably associated with the fact that it is more than improbable to a person skilled in this art that it could be possible to find chiral molecular building blocks which are on the one hand sufficiently heat-stable (at about 300° C.) and on the other hand have an adequate twisting capacity.

In addition, the increasing thermal energy barrier (k·T) must be overcome at these temperatures. This situation means that the person skilled in the art would not expect the formation of a cholesteric phase. In other words, this means that it appears easy to twist short mesogens with respect to one another, while it appears much more difficult to twist long mesogens, since significantly greater elastic rebound forces are to be expected in this case. In the virtually rigid main-chain LCPs, the persistence length of the macromolecule can be regarded as a "long mesogen".

JP-A D9 describes cholesteric main-chain polyesters. The chiral component described is on the one hand the methyladipic acid used by Watanabe (D6), its homologs, analogous chlorine derivatives, or the diols obtainable from each of these by reduction, or on the other hand chiral amylhydroquinone. However, all of these are chiral compounds, to which the comments given above under D6 regarding the industrial disadvantages likewise apply.

Furthermore, LCPs used in industry, such as Xydar® or Vectra®, can only be colored with difficulty. There is, however, a constantly increasing demand for polymers, in particular LCPs, which can be colored better. The primary reasons for this arise from the marking action of coloring. This enables, for example, mistakes to be avoided, for example in plug connections, which must frequently be made using cables whose holders consist of an LCP. It is known amongst experts that existing (nematic) LCPs can only be colored inadequately. Disperse pigments accumulate at the surface and give an unattractive, chalky impression.

EP-A 0 391 368 describes cholesteric liquid-crystal polyesters, but their optically active component is derived from camphoric acid, which is very expensive. No details are given of the color effect exhibited by such polymers.

Macromol. Rapid Commun. 1995, 16, 231, describes chiral, thermotropic copolyester-imides, some of which exihibit a Grand-Jean structure, but only at temperatures above 300° C. The appearance of a color is not described.

In view of the prior art indicated and discussed herein, the invention had a number of objects.

Firstly, one object of the present invention was to provide novel liquid-crystalline polymers and oligomers which, while having otherwise essentially unchanged properties compared with known main-chain LCPs, allow less-complex conversion into moldings by injection molding or similar processing methods known to the person skilled in the art, in particular without having to accept impairment through anisotropic material properties.

A further object of the invention was to find a material which on the one hand can be processed just as easily as existing (nematic) LCPs, but without the attendant disadvantages with regard to anisotropic material properties.

A further object of the invention is to synthesize novel liquid-crystalline polymers which form cholesteric phases in a suitable temperature range and are distinguished by excellent heat stability, enabling thermoplastic processing. It should also be possible here to predetermine a state of aggregation of the material which is suitable for treatment (shaping). In particular, the user should be free to choose whether the polymer is treated in the isotropic state (if this can be achieved without decomposition), in the nematic state (if this can be achieved without decomposition), in the cholesteric state or in the crystalline state with a cholesteric structure (=superstructure); with the exception of the crystalline state, the above states can also exist in the glassy solidified state and can thus also be treated in this state.

Furthermore, it should also be possible to process the novel polymers in a plurality of steps, depending on the desired properties of the treated target product and on the desired effects, where it should be possible to carry out various processing steps in various phase ranges.

A further object of the invention is to provide simultaneously industrially useful and aesthetically pleasing colored materials which have been processed via any desired liquid-crystalline state.

A further object of the invention is to provide novel polymers which are suitable for the preparation of pigments which can be used, in particular, in surface coatings which serve for the coating of metal and plastic surfaces, surfaces of vehicles and other articles of general or industrial use. In particular, it should be possible to prepare, in a simple manner, a polymer which forms cholesteric phases and does not swell in a broad range of solvents, so that its properties remain stable.

By means of certain polymers and oligomers which form cholesteric phases and which essentially consist, as molecular building blocks, of A. at least one bifunctional chiral molecular building block which contains at least one cyclic structural element other than a monosubstituted p-phenylene group, B. at least one bifunctional achiral or racemic molecular building block which contains at least one cyclic structural element containing at least four ring members, and C. at least one bifunctional molecular building block which can be either chiral or achiral, cyclic or acyclic, and is different from the molecular building blocks A and B actually employed, it is surprisingly achieved, in an extremely simple, but nevertheless unforeseeable manner, to provide materials which not only substantially avoid the above-discussed disadvantages of the prior art, but simultaneously provide enormous advantages.

The invention therefore relates to polymers and oligomers which form cholesteric phases and essentially consist, as molecular building blocks, of A. at least one bifunctional chiral molecular building block which contains at least one cyclic structural element other than a monosubstituted p-phenylene group, B. at least one bifunctional achiral or racemic molecular building block which contains at least one cyclic structural element containing at least four ring members, and C. at least one bifunctional molecular building block which can be either chiral or achiral, cyclic or acyclic, and is different from the molecular building blocks A and B actually employed, where the molecular building blocks are linked by ester groups containing (C=O)= and O—C=O, carbonic esters containing O—(C=O)—O, amide groups CONH, N-substituted amide CONR, cyclic imide containing six ring members, azomethines CH=N and CR=N, where the radicals R may be identical or different and are $C_1$-$C_{22}$-alkyl, -aryl or -aralkyl, where, in the case of an acyclic radical or in the case of the presence of a combination with an acyclic radical, the acyclic part may be linear or branched, and where both linear, branched and/or cyclic radicals can contain at least one heteroatom other than C and H and/or may be substituted—including heteroatom-substituted—where the substituent can, in particular, also carry one or more halogen(s), with the proviso that the molecular building block A is not derived exclusively from camphoric acid.

In detail, the novel polymers offer, for example, the following advantages:

Surprisingly high general thermal stability at elevated temperatures.

Conventional LCPs are predominantly built up from aromatic units and are fairly heat-stable per se. This applies even for ambient conditions and definitely under an inert gas. Surprisingly, the novel polymers, which contain non-aromatic structural elements in the broadest sense, always still have similar stability, although the person skilled in the art would have expected reduced stability here. This surprisingly good thermal stability allows a large processing latitude (=processing window), in some cases even without the complex protective-gas technique. Furthermore, it allows higher temperatures during any subsequent treatment and during later use of the articles obtained from the novel polymers.

Surprisingly high thermal stability at relatively low temperatures.

General experience suggests that stability at elevated temperatures is associated with even longer stability at lower temperatures, for example ambient temperatures. This correlation, which is based on a (modified) Arrhenius equation, is utilized, for example, in forced-aging investigations.

High stability to racemization.

Racemization appears to take place—if at all—only to a minor extent, which is revealed without difficulty by the stable reflection color formed by the novel polymers and oligomers which form cholesteric phases. It can be assumed—but without thereby binding the invention to a theory—that this high stability is caused by the particular components A) (chiral comonomers) containing at least one cyclic unit other than a monosubstituted p-phenylene radical.

The helical pitch of the cholesteric phase determines its reflection color.

The selective reflection wavelength can, in the context of the invention, be adjusted through the choice of a suitable comonomer A) and can adopt values in a broad range from UV into IR. Values of industrial interest are from 200 nm to 20.0 µm; for pigments and LCP colorants, the range from 300 nm to 1000 nm is preferred. However, the visible range between 400 and 800 nm with the colors (copper) red, (gold) yellow, green, blue and violet is very particularly preferred for pigments and LCP colorants, virtually all colors being visible by changing the viewing angle. For materials made from the novel polymers in which the reflection color is unimportant for the coloring, the helical pitch can also be set to be greater than 20 µm by choosing very little chiral comonomer (in the vicinity of the minimum incorporation content of >0.01%); the limit value "infinite" is expressly not adopted here because this would correspond to the known nematic phase.

Usable layers and pigments are obtainable without the need for crosslinking, as in the case of the known siloxane polymers.

This step is unnecessary in the case of the novel polymers, but can be carried out in addition in the manner known to the person skilled in the art if particularly needed if there is a particular requirement, at present not evident, for this.

A suitable choice of the parameters, for example 0.1<h<2 [dl/g] gives a material which, owing to its brittleness, is highly suitable for grinding and, as shown by scanning electron microscope studies, tends toward the desired slate-like fracture, which is particularly suitable for the production of flakes and pigments for effect coatings. Nevertheless, the mechanical stability (pump stability) here, like, naturally, in the materials in which h>2 [dl/g], is sufficiently good to satisfy the vast majority of industrial demands.

High chemical inertness.

Owing to its substantial inertness to chemical agents and solvents in particular, the novel polymers are compatible with many other auxiliaries and can be mixed therewith.

Versatility of colored materials.

Materials which appear colored owing to their reflection can be used in many areas, extending from technically necessary markings of individual (equipment) parts to aesthetically pleasing design of everyday appliances.

Markings in the invisible region.

Markings in the invisible region are particularly useful for automatic recognition of objects, for example using a near-IR LED laser, which is invisible to the human eye. This can be compared most graphically with a barcode reader at the supermarket checkout.

Thermoplastic processability below the decomposition temperature.

The principle reproduced in claim 1 is very versatile and opens up a broad, but nevertheless limited field of how novel polymers can be obtained. The choice of at least three building blocks which, in the general case, make different contributions toward the length of the molecule, effectively prevents crystalline "engagement" of adjacent molecular chains through infinitesimally short parallel shifts. This model is known as "longitudinal register" and can be regarded as a preliminary stage to (lateral) crystallization (A. Skoulios, Makromol. Chem. Phys. 196, 2081, 2092 (1995)). Accordingly, with at least three building blocks in the polymer, such precrystalline states are energetically unfavored, which is evident from a lowering of most of the phase transition temperatures. One of the most important practical effects is that the materials can be thermoplastically processed well below their decomposition temperature.

The unexpectedly high twisting capacity of the chiral components in the novel polymers makes it still desirable to have at least one third component in the polymer, since otherwise it is easy to see that the pitch and reflection would be shorter than 200 nm, which would only be of virtual importance owing to the inherent UV absorption of the material. If component C) is also chiral, this third component then preferably has a twist direction opposite to that of the first component A) (partially compensated cholesteric phase).

Relatively "simple" polymers already have the advantages according to the invention.

Even one of the simplest imaginable and cheapest polymers covered by the invention, namely PET, in which some of the molecular building blocks resulting from the monomer glycol have been replaced, for example, by isosorbitol, promises the advantageous properties of the invention. Even an isosorbitol segment linked to a terephthalic acid element appears to be sufficiently mesogenic.

Aesthetically pleasing surface protection.

The novel polymers can form a protective coating in the sense of an organic enamel which adheres well to metal surfaces.

The polymers of the invention are copolymers in the broadest sense. Novel polymers which form cholesteric phases contain at least one bifunctional chiral molecular building block A) which contains at least one cyclic structural element other than a monosubstituted p-phenylene group.

For the purposes of the invention, the term "molecular building block" is used in the sense of a "constitutional unit", ie. a structural unit present in the polymer chain which is based on a certain monomer or comonomer. The term structural element in turn is taken to mean a radical which participates in the synthesis of the respective monomer or comonomer. The monomer or comonomer can be composed of a plurality of structural elements. The structural element (s) forming the monomer or comonomer can in turn be introduced into the finished polymer as a structural unit in the reaction which generates the polymer. In particular, the monomer or comonomer can also contain structural elements which are not introduced into the polymer, or only some of which are introduced into the polymer, during the polymer-generation reaction, for example are eliminated during a polycondensation reaction.

This will be illustrated using the example of a novel polymer consisting of the three monomers isosorbitol (for the chiral molecular building block A), terephtnaloyl dichloride and ethylene glycol (components for the molecular buildings blocks B) and C)).

These components can be reacted in a suitable manner, for example by polycondensation, to give polymers which contain the following molecular building blocks or structural units linked in a certain way in accordance with the known rules of chemistry:

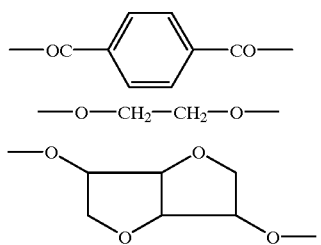

In the linked state (ie. based on the polymer), the structural units or molecular building blocks include the following structural elements, which are defined as follows with the polymer in mind:

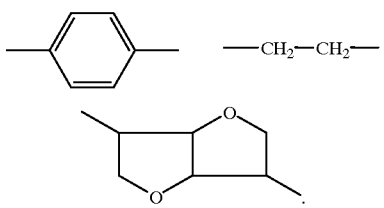

The structural units shown above also cover the bridging elements connecting the three structural elements shown; these bridging elements have the following appearance in this example:

—OOC—

References to structural element in connection with monomers is intended to mean that this is a radical of the monomer. In the example selected, said monomers would have the following structural elements:

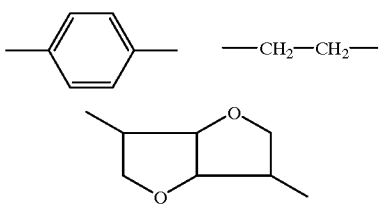

and ClOC— and HO—.

Of these, the first are likewise incorporated into the polymer as structural elements, while ClOC— and HO— are incorporated into the polymer as bridging element with elimination of HCl.

It should also be noted in the case of structural elements incorporated into the polymer that they can be composed of different "substructures", although each of these substructures is referred to in the invention as a structural element. For example, if Cl—OC—CH$_2$—O—F—O—CH$_2$—CO—Cl is used instead of ClOC—F—COCl as monomer, a polymer is produced which contains, inter alia, the following structural unit: —(CH$_2$)—O—F—O—(CH$_2$)—. The structural unit is composed of the structural elements —O—(CH$_2$)— and —F—.

Regarding the "bridging elements" of the polymer, the following should be noted:

The polymerization reactions leading to novel polymers can form a wide variety of linking groups, a common feature of which is that they are derived in some way from the carbonyl group C=O.

Possible bridging elements include, inter alia, ester groups containing (C=O)O and O—C=O, carbonic esters containing O—(C=O)—O, amide groups CONH, N-substituted amide CONR, cyclic imide containing five or six ring members, azomethines CH=N and CR=N, where the radicals R in the aforementioned bridging elements may be identical or different and are C$_1$–C$_{22}$-alkyl, -aryl or -aralkyl, where, in the case of an acyclic radical or in the case of the presence of a combination with an acyclic radical, the acyclic part may be linear or branched, and where both linear, branched and/or cyclic radicals can contain at least one heteroatom other than C and H and/or may be substituted—including heteroatom-substituted—where the substituent can, in particular, also carry one or more halogen(s).

Preference is given to the abovementioned bridging elements with the exception of cyclic imide having five ring members, particularly with the exception of cyclic imides having five or six ring members.

However, this does not exclude the novel polymers being obtained by other methods known to the person skilled in the art, for example by using monomers which already contain linking elements or bridging elements which usually only form in the polymerization reaction. Thus, for example, a polymer formed with the involvement of bis(2-hydroxyethyl) terephthalate as monomer also belongs to the invention, although it already contains two preformed ester groups and thus also introduces two molecular building blocks or monomer building blocks, namely the glycol radical and the terephthaloyl radical, in the sense of the invention. An analogous situation applies to the preparation of the polymers from at least one oligomer and also to the preparation of the novel polymers from a preformed polymer by equilibration with one or more components selected from polymers, oligomers and monomers.

Component A (molecular building block A) according to the invention includes in general all chiral components which contain at least one cyclic structural element other than a monosubstituted p-phenylene group. The term p-phenylene group here is taken to mean the following structural element carrying only one substituent other than H (X is not H):

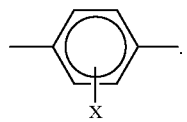

Biphenylylenes, naphthalenylenes, further polycondensed aromatic radicals, etc., do not come under the heading phenylenes in the scope of the invention and accordingly also belong, whether monosubstituted, disubstituted or polysubstituted, to the invention as a structural element of the molecular building block A).

In order to produce a cholesteric phase, at least one of the cyclic structural elements making up component A must of course be optically active.

The molecular building blocks A are advantageously recruited from the chiral pool. Experts understand this (Ullmanns Encycl. Chem. Techn., 5th Edition, Vol. A18, p. 183, 1991, VCH Verlag) to mean the totality of naturally occuring chiral compounds. They include, in particular, chiral units of both animal and vegetable origin. However, this in no way excludes the use of fully synthetic or partially synthetic chiral molecular building blocks. For example, valuable chiral components which either do not occur in nature or only do so in relatively small amounts can be obtained from natural products by one or more synthetic steps.

Particularly suitable groups are derived, for example, from carbohydrates. For example, suitable starting materials are sugars, sugar alcohols and derivatives obtainable therefrom, in particular also anhydrosugar alcohols.

A further important group comprises amino acids and amino alcohols derived therefrom. An example thereof is the amino acid proline which contains a cyclic unit, particularly preferably in the natural form L-proline. The chiral monomer building blocks can usually be purchased commercially in a form suitable for carrying out the polymerization reaction and are thus available. If non-enantioselective synthetic steps give racemic mixtures, the latter can be resolved into the enantiomers using processes known to the person skilled in the art and variants thereof, such as, for example, fractional crystallization of diastereomeric salts or chromatography on chiral stationary phases, where, in particular, (modified) cellulose may be mentioned as an adsorbant.

Preferred chiral structural elements which can be incorporated into the novel polymers as part of corresponding molecular building blocks include the following, inter alia:

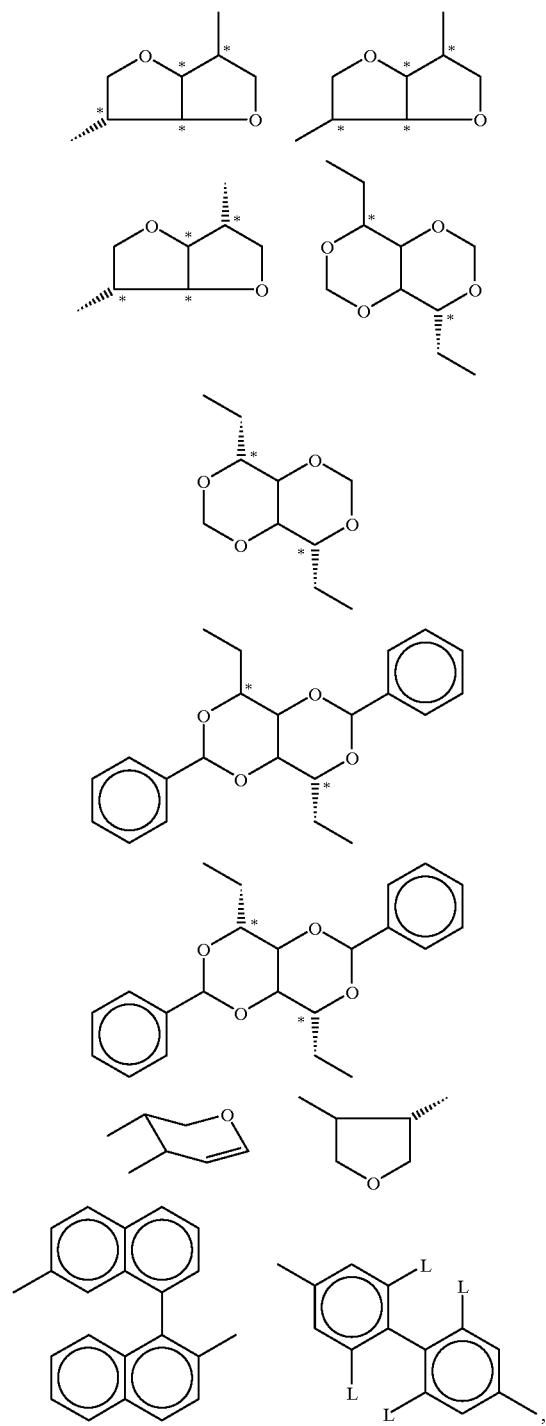

where L is $C_1$–$C_4$-alkyl, $CF_3$, $C_1$–$C_4$-alkoxy, halogen, COOR, OCOR, CONHR or NHCOR, and R is $C_1$–$C_4$-alkyl or hydrogen.

Preferred chiral structural elements are also optically active cyclic derivatives of glycol which conform to the following formula:

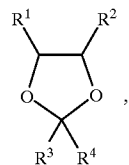

in which $R^1$–$R^4$, independently of one another are identical or different and are hydrogen, $C_1$–$C_4$-alkyl, which may also be substituted by hydroxyl and may be interrupted by —O—, phenyl or substituted or unsubstituted carboxyl, where, in the case of identical radicals $R^1$ and $R^2$, the RS configuration is excluded.

Particular radicals $R^1$ and $R^2$ are, inter alia, $CO_2CH_3$, $CO_2CH_2CH_3$, $CO_2(CH_2)_2CH_3$, $CO_2(CH_2)_3CH_3$, $CO_2CH(CH_3)_2$, $CO_2C(CH_3)_3$ and —CH(OH)CH$_2$(OH).

Further preferred structures are the non-meso forms of tetrahydrofuran-2,3,4,5-tetracarboxylic acid, the anhydrides thereof, and the tricarboxylic acids and the dicarboxylic acids obtainable therefrom by decarboxylation: tetrahydrofuran-2,3,4-tricarboxylic acid, tetrahydrofuran-2,3,5-tricarboxylic acid, tetrahydrofuran-2,5-dicarboxylic acid, tetrahydrofuran-2,3-dicarboxylic acid and tetrahydrofuran-3,4-dicarboxylic acid.

The specific bifunctional chiral molecular building blocks which contain the following structures are also suitable:

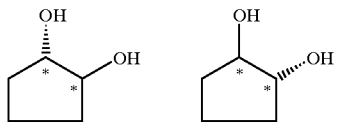

Of the abovementioned compounds, particular preference is given to

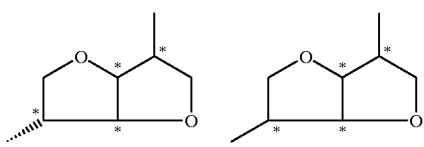

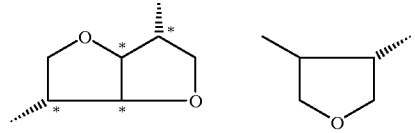

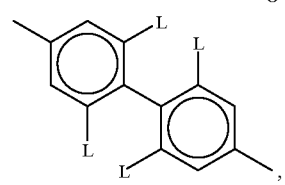

Particular preference is also given to derivatives of isosorbitol (1,4:3,6-dianhydro-D-sorbitol), of isomannitol (1,4:3,6-dianhydro-D-mannitol) and of isoiditol (1,4:3,6-dianhydro-D-iditol, 1,4:3,6-dianhydro-L-iditol), namely the monoacetates and diacetates, —O—CH$_2$—COOH, —NH$_2$, —O—CH$_2$—CH$_2$—OH, —O—F—COOH, etc.

Also of considerable interest are the chiral structural elements derived from or present in the following compounds:

D- and L-proline, in particular L-proline, and the corresponding amino alcohol prolinol (=2-(hydroxymethyl) pyrrolidine), particularly preferably likewise in the L-form;

structural elements such as

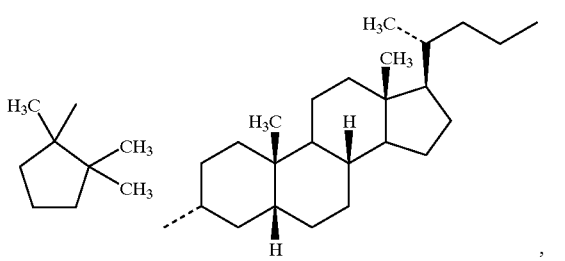

which can be derived from camphoric acid and lithocholic acid; molecular building block A preferably does not consist of structural elements derived from camphoric acid and particularly preferably does not contain them;

derivatives of resin acids, in particular of abietic and dehydroabietic acid, particularly advantageously the phenolic carboxylic acid obtainable from dehydroabietic acid by autoxidation and Hock rearrangement, which, as an AB monomer, behaves analogously to 4-hydroxybenzoic acid.

For explanation, the following structural formulae are given by way of example:

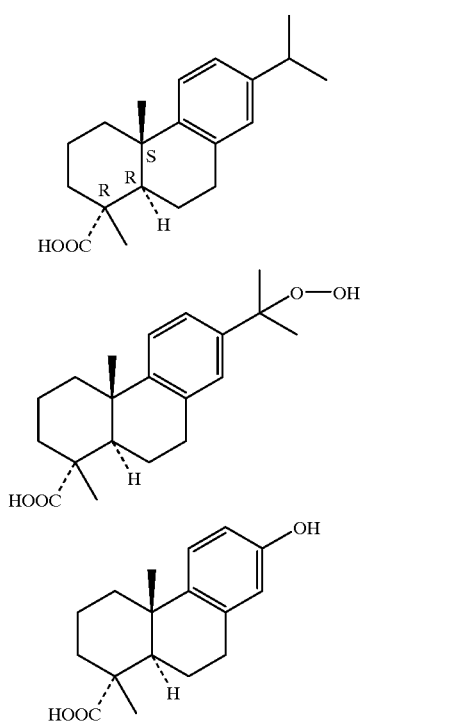

where the phenolic carboxylic acid (structure on the right) has the systematic name 1,2,3,4,4a,9,10,10a-octahydro-7-hydroxy-1,4a-dimethylphenanthrenecarboxylic acid. This compound provides the following structural element in the novel polymer or oligomer forming cholesteric phases:

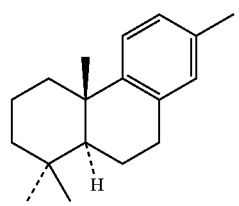

Structural elements containing a 1,4-linked cyclohexane ring formed from monomers such as:

monosubstituted 1,4-cyclohexanedicarboxylic acids, particularly favorably R- or S-2-methylcyclohexane-1,4-dicarboxylic acid, or monosubstituted cyclohexane-1,4-diols, for example extremely advantageously those such as R- or S-2-methylcyclohexane-1,4-diols;

bisphenol structural elements, such as

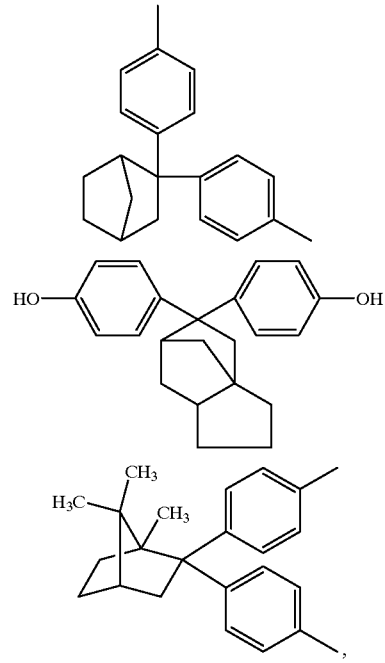

resulting from bisphenols derived from mono-, bi- or polycyclic ketones or from terpene ketones, such as camphor;

structural elements derivable, for example, from bisphenols derived from isophorone:

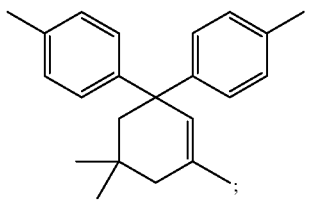

derivatives of Troeger bases:

(5S,11S)-(−)-2,8-dimethyl-6H,12H-5,11-methanodibenzo[b,f][1,5]diazocine or (5S,11R)-(+)-2,8-dimethyl-6H,12H-5,11-methanodibenzo[b,f][1,5]-diazocine, for example in each case as the 2,8-dicarboxylic acid or in each case as the 3,9-diamino derivative obtainable by nitration and reduction;

chiral structural elements derived from the following compounds:

R- or S-1-(4-carboxyphenyl)-1,3,3-trimethylindane-5-carboxylic acid, 1,2-bis(4-hydroxyphenyl)propane, propylene-1,2-bis(4-benzoic acid), 4-(3-hydroxyphenylsulfoxy)benzoic acid, spirobicyclohexane-4,4'-dicarboxylic acid (described in Boehm et al., Tetrahedron, Asym. 5, 1281 (1 994));

structural elements arising from spiro[9H]bifluorene derivatives, preferably 2-acetoxyspiro[9H]bifluorene-2'-dicarboxylic acid and 2-acetaminospiro-[9H]bifluorene-2'-dicarboxylic acid.

The cyclic structural element of the molecular building block A preferably contains two or more ring systems, and is particularly preferably bicyclic or polycyclic.

Said chiral molecular building blocks A are involved either alone or as a mixture of two or more in the synthesis of the novel polymer or oligomer forming cholesteric phases.

For the purpose of the invention, the polymers and oligomers forming cholesteric phases contain, as molecular building blocks, in addition to the essential component A, as components B and C at least one bifunctional, achiral or racemic molecular building block B which contains at least one cyclic structural element containing at least four ring members, and at least one bifunctional molecular building block C which can be either chiral or achiral, cyclic or acyclic, and is different from the molecular building blocks A and B actually employed.

The bifunctional molecular building blocks B contain a cyclic structural element containing at least four ring members. In each case, the molecular building blocks B are achiral or racemic, but are not optically active.

Suitable bifunctional achiral or racemic molecular building blocks are, according to the invention, all those which give the typical elongate molecular structure of so-called main-chain LCPs, which is what the novel polymers are.

These include the majority of the monomers known to the person skilled in the art, which have the common feature that they give the polymer chain an elongate linear character because the linking points are virtually colinear, ie. are arranged at precisely or sufficiently close to 180 degrees.

Examples of the p-phenylene in terephthalic acid, hydroquinone, 4,4'-biphenol, 4,4'-bibenzoic acid, p-aminophenol, 2,5-pyridinedicarboxylic acid, trans-1,4-cyclohexanedicarboxylic acid, which can easily be discovered by the non-skilled worker from the large number of relevant monographs and review articles (for example Encycl. Polym. Sci. Eng. Vol. 9, pp. 1–61, Rev. Ed., Wiley, 1987).

A small proportion of monomers (less than 50%, preferably less than 40%) which make the structural elements available to the molecular building blocks B can differ from the requisite linearity to a greater or lesser extent. The person skilled in the art knows that these non-linear moieties in the otherwise linear polymer chain cause dislocations and camshaft movements through kinks, which improve the processing properties of the materials. Lateral substituents are also advantageous for the processing properties.

These monomers which are known for LCPs and in some cases are already conventional are preferred structural elements. Particular preference is given to those which have already been and are being employed for commercial LCPs or LCPs which have been or are being tested on the market.

Representative monomers which satisfy these requirements can preferably be selected from the following groups, which expressly also include simple derivatives which may be helpful for activating the polycondensation.

1. Dicarboxylic acids derived from a substituted or unsubstituted aromatic, heteroaromatic, cyctoaliphatic, bicycloaliphatic or multicycloaliphatic, linear or branched aliphatic hydrocarbon, which can also contain at least one heteroatom per ring element. The basic hydrocarbon can also contain a plurality of identical or different structural elements from those mentioned above, which can be linked via identical or different bridging members. A selection of bridging members is the following: a chemical bond, —C=C—, C—C triple bond, —S—, —O—, —SO—, —SO$_2$—, etc. This means that the two carboxylic acid groups can be bonded in the same or different ways. However, the two carboxylic acid groups must not be capable of forming a stable cyclic anhydride. In this case, it would be end-group formers in such recipes which contain monomers having amino groups (see under f-j, I herein), in which case cyclic imide groups can form.

2. Tricarboxylic acids which can be derived from the dicarboxylic acids described under a), the third carboxylic acid group being introduced in such a way that a 5- or preferably 6-membered cyclic imide group can form with an amino group of another monomer (for example f-j, I). Other isomeric tricarboxylic acids can be selected in order to produce branches of the molecular chains, which are linear per se, although their content should preferably be selected so low that undesired crosslinking of the material does not occur to a significant extent.

3. Tetracarboxylic acids, with the proviso that in each case two of the acid groups are capable of forming an imide unit containing a 5- or preferably 6-membered ring together with a simultaneously present monomer carrying at least one amino functionality.

4. Hydroxycarboxylic acids derived from the structures indicated under a) by replacement of one of the two carboxylic acid groups by an HO function, where these can be bonded either phenolically, ie. to a (hetero) aromatic ring, or alcoholically, ie. to an aliphatic radical. This aliphatic radical can be cyclic and/or linear. A further differentiation feature is whether the HO function is primary or secondary. The functional structural element hydroxymethylcyclohexyl should be particularly emphasized here. Unsuitable structures are those which result in cyclic lactones, ie. both intramolecularly or intermolecularly between two molecules. Hydroxycarboxylic acids are preferred for synthesizing the structural elements B and/or C.

5. Diols derived in a similar manner to d) from a) or from a) by replacement of the two carboxylic acid functions by HO functions. There are virtually no restrictions here regarding the substitution pattern, since side reactions caused by ring formation are not expected. Representatives which should be emphasized are ethylene glycol and 4,4'-biphenol.

6. Aminophenols and in particular N-acyl and N-acyl-N-alkyl derivatives. All substitution patterns as described under d) can advantageously be employed here. However, the ortho-position does not have to be avoided here owing to the rather improbable formation of lactams, but instead owing to the formation of oxazole derivatives together with carboxylic acids, which, as a side reaction, can result in end groups.

7. Aminoalcohols; here, substitutions, which, as is known, tend to form heterocyclic compounds, should be avoided. These include, in particular, 2-aminoethanol, which easily forms oxazoline with carboxylic acid groups.

8. Aminocarboxylic acids; in principle, all are possible, but only the structural elements which tend toward intramolecular or intermolecular, bimolecular lactam formation should be avoided.

9. Aminodicarboxylic acids can be selected according to the criteria given under h). Preference is given to substitution patterns which allow the two carboxylic acid functions to build up a 5- or preferably 6-membered imide ring as linking element.

10. Diamines, N-acyl derivatives and diisocyanates are, in the case of an aromatic skeleton, subject to restrictions in the substitution pattern regarding ortho-substitution, which, as is known, results in the formation of benzimidazole with carboxylic acids.

11. Dialdehydes are amongst the less-preferred monomers owing to their instability in general and tendency toward oxidation in particular, and in addition they are not very readily available. Nevertheless, glyoxal and terephthalaldehyde are suitable for industrial purposes.

12. Aminoaldehydes; for the same reasons as given under k), this class is not amongst the particularly preferred, although individual representatives, which are readily available are nevertheless of particular interest, in particular 4-aminobenzaldehyde.

13. Hydroxyaldehydes; the same applies here as stated under 1), the representative of greatest industrial interest being 4-hydroxybenzaldehyde.

14. Monomers which carry any desired combination of two or three of the abovementioned functional groups, with the proviso that substitution patterns which give rise to side reactions as stated above are avoided.

Examples of simple activating substances include, inter alia:

derivatives of acetic acid and its homologs, such as propionic acid and butyric acid, the latter being less preferred simply because of its odor; acetic anhydride, ketene, acetyl chloride, mixed anhydride with formic acid or carbonic acid, trimethylchlorosilane, triphenylphosphite, polyphosphoric acid; carbodiimides, such as dicyclohexylcarbodiimide, diphenyl carbonate, dimethyl carbonate and all other substances with an activating action which are known to the person skilled in the art.

In addition to Lewis acids, such as organotin compounds, other catalysts can also be added. Catalysts which have proven successful in general are alkali and alkaline earth metal salts of fatty acids, in particular alkali salts of lower fatty acids. Potassium acetate, which can also be added in the polycondensation for acceleration purposes, has proven very particularly suitable. So-called Steglich bases, for example 4-(N,N-dimethylamino)-pyridine and N-pyrrolidinopyridine, are also helpful for the activation. However, the activation generally succeeds even without additives.

The monomers which are of particular interest according to the invention from groups a) to n), which, after incorporation into the novel polymers, result, depending on the polymerization reaction, in corresponding molecular building blocks B containing the derived structural elements, include, inter alia, the following, where the respective reactive group is listed or not listed or can be varied in accordance with the knowledge of the person skilled in the art:

terephthalic acid, trifluoromethylterephthalic acid, fluoroterephthalic acid, chloroterephthalic acid, bromoterephthalic acid, methoxyterephthalic acid, phenylterephthalic acid, phenoxyterephthalic acid, phenylthioterephthalic acid;

isophthalic acid, 5-sulfoisophthalic acid;

carbonic acid, preferably as ester, particularly preferably as dimethyl carbonate and diphenyl carbonate;

4,4'-azobenzenedicarboxylic acid, 4,4'-azoxybenzenedicarboxylic acid;

Schiff bases, such as C,N-bis(4-carboxyphenyl)azomethine;

stilbene-4,4'-dicarboxylic acid, a-methylstilbene-4,4'-dicarboxylic acid, tolan-4,4'-dicarboxylic acid, 2,5-furandicarboxylic acid, 2,5-thiophenedicarboxylic acid, thiadiazoledicarboxylic acids, in particular 1,3,4-thiadiazole-2,5-dicarboxylic acid;

pyridine-2,5-dicarboxylic acid, pyridine-2,5-dicarboxylic acid, pyrimidine-2,5-dicarboxylic acid;

2,6-naphthalenedicarboxylic acid, 1,4-naphthalenedicarboxylic acid;

3,3'-biphenyldicarboxylic acid, 4,4'-biphenyldicarboxylic acid, 2,2'-biphenyldicarboxylic acid, 2,4'-biphenyldicarboxylic acid;

fluorenedicarboxylic acids, fluorenonedicarboxylic acids, 4,4'-oxydibenzoic acid, 3,4'-oxydibenzoic acid;

4,4'-thiodibenzoic acid, 3,4'-thiodibenzoic acid;

4,4'-sulfonyldibenzoic acid, 4,4'-sulfinyldibenzoic acid;

tetrahydrofuran-2,3,4,5-tetracarboxylic acid as a mixture of the diastereomers formed industrially, perylene-3,4,9,10-tetracarboxylic acid, in particular as the anhydride, naphthalene-1,4,5,8-tetracarboxylic acid, in particular as the anhydride;

cyclohexane-1,4-dicarboxylic acid in the trans- or cis-form, or preferably as a technical-grade mixture of the two forms;

cyclohexane-1,3-dicarboxylic acid in the trans- or cis-form, or preferably as a technical-grade mixture of the two forms;

cyclohexane-1,4-dimethanol, cyclohexane-1,3-dimethanol, biscyclohexyl-4,4'-dicarboxylic acid; 4-(4-carboxyphenyl)cyclohexanecarboxylic acid;

4-(4-aminomethylcyclohexyl)aniline, 4-hydroxybenzoic acid, 2-hydroxynaphthalene-6-carboxylic acid, 4-hydroxyphenylbenzoic acid, 2-hydroxynaphthalene-4,5-dicarboxylic acid, 2-aminonaphthalene-4,5-carboxylic acid, 4-aminobenzoic acid, 2-aminonaphthalene-6-carboxylic acid, 4-aminophenylbenzoic acid;

hydroquinone, chlorohydroquinone, phenylhydroquinone, resorcinol, pyrocatechol, 4,4'-biphenol, 2,2'-biphenol, 2,4'-biphenol, bisphenol A-Z;

naphthalenediols, such as 2,6-naphthalenediol, 1,4-naphthalenediol, 1,5-naphthalenediols, 1,2-naphthalenediol, 1,3-naphthalenediol, 1,6-naphthalenediol, 2,3-naphthalenediol, 2,7-naphthalenediol; hydroxynaphthylamine having the substitution patterns indicated under "naphthalenediols";

4-aminophenol, 4-acetaminophenol, 3-aminophenol, p-phenylenediamine, m-phenylenediamine;

ethylene glycol and bis(2-hydroxyethyl) terephthalate;

cyclohexane-1,4-dimethanol, cyclohexane-1,3-dimethanol, 1,4-bis(hydroxymethyl)benzene, 1,3-bis(hydroxymethyl) benzene, 4,4'-dihydroxy-a-methylstilbene, trans,trans-4,4'-bicyclohexanediol, 2,6-decalindimethanol, cubanedicarboxylic acid, biscubanedicarboxylic acid; bicyclododecanedicarboxylic acid, bicyclododecanedimethanol;

dibenzodioxin-2,7-dicarboxylic acid, dibenzodioxin-2,3,6,7-tetracarboxylic acid, thianthrene-2,7-dicarboxylic acid, thianthrene-2,3,6,7-tetracarboxylic acid.

The structural units or molecular building blocks B which are present in the monomers listed and are incorporated into the novel polymer do not contain any hydrolyzable linkages. For this reason, a polymer, prepared, for example, from bis(2-hydroxyethyl) terephthalate as component B, also belongs to the invention. Hydrolyzable linkages in this sense are those which participate in the equilibrium during a typical polycondensation, for example ester, amide, imide or CH=N, while those such as ether and thioether are regarded as nonhydrolyzable for the purposes of the invention.

The third essential component involved in the synthesis of the novel polymer is at least one bifunctional molecular building block C, which may be either chiral or achiral, cyclic or acyclic, and is different from the molecular building blocks A and B actually employed. Accordingly, suitable components C according to the invention are preferably also all molecular building blocks mentioned in the lists describing components A and B; the molecular building block C is preferably recruited from the group consisting of molecular building blocks B. It need only be ensured for the purposes of the invention that the building blocks A, B and C actually present in a polymer are different from one another.

In addition to the types of molecular building block listed in A and B, suitable components C are also chiral acyclic building blocks, such as, for example, molecular building blocks based on a monomer such as 1,2-propanediol.

For the purposes of the invention, the amount of the molecular building block(s) A present in the finished polymer can vary over a broad range without the advantages achievable by means of the invention being lost. In a preferred embodiment, the novel polymer which forms cholesteric phases comprises from 0.01 to 50 mol % of the molecular building block A, based on the total number of moles of the molecular building blocks A, B and C. If the proportion of A is below 0.01 mol %, the helical pitch moves toward the limit value and is thus transformed into the known nematic phase, so that the polymer containing <0.01 mol % can no longer form an industrially useful cholesteric phase. If the proportion of A is greater than 50 mol %, the result is usually materials whose helical pitch is <200 nm. In this range, firstly no selective reflection is expected, since inherent absorption would occur, and secondly, no special mechanical properties are expected.

The content of molecular building block A in the polymer is advantageously approximately between 0.1 and 30 mol %, based on the sum of all constituents from molecular building block groups A, B and C.

Particularly preferred polymers are

X7G™, which consists of the following building blocks

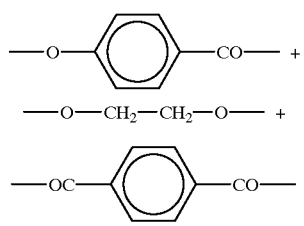

and has a preferred composition in terms of amount of about 60 mol % of 4-oxybenzoyl, 20 mol % of ethylenedioxy and 20 mol % of terephthaloyl or 60 mol % of 4-oxybenzoyl and 40 mol % of terephthaloyl;

Xydar™, which consists of the following building blocks

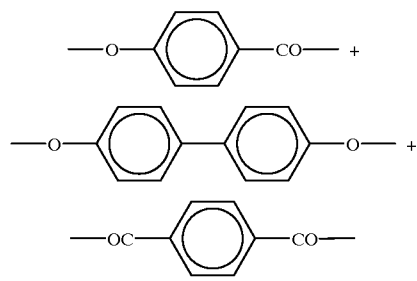

Zenite™, which consists of the following building blocks

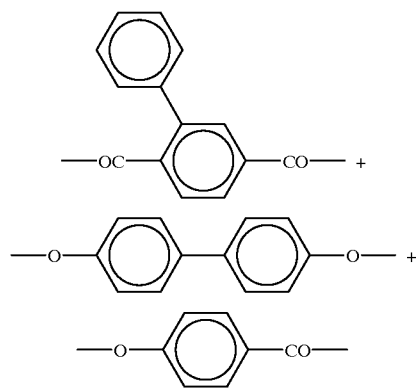

Vectra™ which essentially consists of the following building blocks

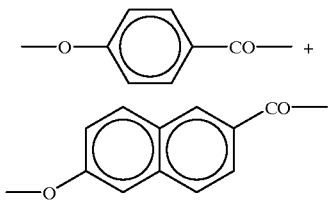

and preferably has a composition of about 50 mol %/50 mol % of the two building blocks (Vectra™ A), or a composition in which an amount of, in total, about 10 mol % of 4-oxyphenyleneimine structural units (corresponds to a monomer, for example 4-acetaminophenol) is incorporated into the polymer instead of one or both of the building blocks mentioned (Vectra™ B), or a composition which corresponds to Vectra™ E, and special development products, such as COTBPR, having the following structural units

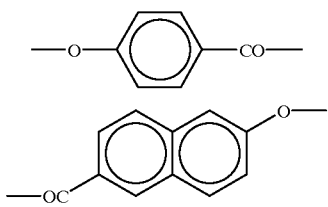

-continued

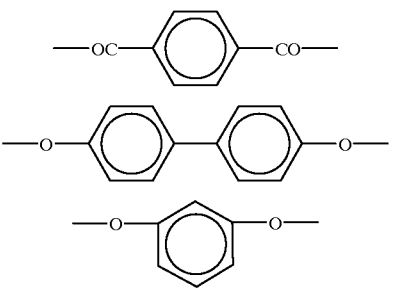

where between about 0.01 and 50 mol % of the respective ol components have been replaced by isosorbitol

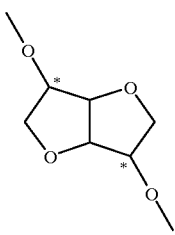

If no ol component is present in the formulation, an approximately corresponding molar amount of one of the monomers described having opposite functionality must of course be added to the formulation, ie., for -example, one of the dicarboxylic acids a), in the simplest case terephthalic or isophthalic acid or 2,5-furandicarboxylic acid or 1,4-cyclohexanedicarboxylic acid, in the case of Vectra A.

The novel polymers are distinguished by particularly high resistance, even without additional crosslinking.

By means of suitable measures, it is also possible to prepare block copolymers comprising segments of the novel polymers with other amorphous or crystalline polymers; these block copolymers are particularly suitable for heavy-duty articles and flakes. Examples of amorphous polymers are PPO, polysulfones, polycarbonate and polystyrene, while examples of crystalline polymers are PPS, PP and PE.

For certain applications, such as coatings or analytical purposes, it may be desirable to obtain the novel polymers in solutions. This can be achieved by means of solvents and solvent mixtures in which at least one of the components contains bonded halogen. Besides others, suitable solvents for this purpose are hexafluoroisopropanol, pentafluorophenol, chlorophenol with methylene chloride or 1,1-dichloroethane, trifluoroacetic acid, methylene chloride, chloroform and/or dichloroacetic acid.

Particular preference is given to the following solvent systems: hexafluoroisopropanol/pentafluorophenol, chlorophenol/methylene chloride or 1,1-dichloroethane, trifluoroacetic acid/methylene chloride or chloroform/ dichloroacetic acid, where the invention also covers solvents and mixtures which give a solution only at temperatures above room temperature. This in turn gives rise to a possible way of preparing novel pigments, namely crystallization from optionally supersaturated solution (Ostwald aging) and if desired in the presence of additives as are customary for the preparation of conventional, absorbent pigments.

The novel polymers are obtainable over a broad molecular-weight range without losing their characteristic property, namely the formation of cholesteric phases.

The polymers advantageously have a solution viscosity (Staudinger index) of between 0.1 and 20 dl/g, particularly preferably in the range between >0.1 and <10 dl/g, very particularly preferably between >0.1 and <2.0 dl/g. For oligomers, the solution viscosity (h in dl/g) can also be below 0.1.

Materials preferably have a Staudinger index of >2. For pigments, the preferred range is between 0.1 and 2.

The brittleness of the novel polymers in the selected viscosity range is advantageous for pigment shaping.

The present invention also relates to the provision of a process for the preparation of polymers, preferably novel ones, which form cholesteric phases, in which at least one bifunctional achiral or racemic molecular building block B which contains at least one cyclic structural element containing at least four ring members, and at least one bifunctional molecular building block C, which can be chiral or achiral, cyclic or acyclic, where the molecular building blocks B and C together are capable, on their own, of forming LCPs, are reacted with at least one bifunctional chiral molecular building block A which contains at least one cyclic structural element other than a monosubstituted p-phenylene group.

Here too, the building block C can be selected from groups A and B. However, a building block C actually employed is different from the molecular building blocks specifically employed simultaneously from groups A and B.

In an advantageous process variant, the preparation process is relatively universal and simple, since, in the standard formulation of any desired (nematic) LCP, 0.01–50 mol % of one or more monomers are replaced by the novel chiral building blocks in order to obtain novel polymers.

A wide variety of embodiments are possible. Depending on the target later property profile of the polymer, a selection can be made from various variants. For example, (activated) monomers deposited from the gas phase can be converted, individually or as a mixture, into the novel polymers on a substrate.

The novel polymers are also obtainable by polymerization in solution (homogeneously and at interfaces between at least two immiscible media).

In suitable solvents, which can also be held in the supercritical state, novel polymers can be obtained by polycondensation or polyaddition, both of which can be carried out simultaneously or successively. It is unimportant here that the general low solubility of the polymer causes the solution of the monomers to be converted into an emulsion or suspension.

However, preference is given to polycondensation reactions in the melt. These can be carried out in various ways.

For a continuous or batch procedure, stirred reactors, reactor cascades or compounders specifically for viscous media are commercially available and suitable. Also suitable are reaction or vented extruders and combinations thereof and combinations with upstream thin-film evaporators or flash evaporators.

The monomers and, if desired, one or more activators can generally be added in any desired sequence or also simultaneously.

In a preferred embodiment, the chiral component is not added to the reaction mixture until relatively late, in order to avoid giving unnecessary impetus to a racemization reaction, which is possible in principle. It is also possible to add a concentrate of the chiral component in the form of an oligomer or polymer, for example by a masterbatch process, in order to distribute dyes and other additives in the polymer. Mixtures of non-equilibrated or incompletely equilibrated chiral oligomers or polymers in the completely achiral or at least less chiral polymer matrix are therefore also novel. The novel oligomers and polymers can thus likewise act in accordance with the invention as chiral dopants for other liquid-crystalline materials.

The very particularly preferred chiral components are dianhydrohexitols, namely isosorbitol, isomannitol and isoiditol. These can be employed in virtually any desired form:

chemical dehydration using ketene, acetic anhydride or acetyl chloride. Formation of monoacetate and/or diacetate may be advantageous, since it is accompanied by a purification effect, where acetic anhydride is particularly suitable for a type of extractive esterification from aqueous preparations.

A specific, preferred embodiment is nonaqueous dispersion polymerization (see, for example, EP-0 276 915, which is expressly incorporated herein by way of reference).

Here, the polymers are obtained rapidly and under gentle conditions by polycondensation of the conventional monomers in the presence of a nonsolvent and in the presence of an emulsifier, the larger surface area of the particles probably being advantageous for removing the more volatile radicals of the activating agents, in the simplest case acetic acid. This embodiment is also suitable for producing pigment particles directly.

However, it is also possible to establish low molecular weights and thus viscosities, and to a lesser extent also the phase transition temperatures, in a manner known to the person skilled in the art with the aid of end-group formers.

The invention also relates to blends and composites comprising one or more of the polymers and/or oligomers forming cholesteric phases which are described herein.

The invention furthermore also relates to shaped structures comprising one or more of the polymers and/or oligomers forming cholesteric phases which are described herein.

The shaped structures are preferably injection-molded articles, extruded profiles and pipes, films, tapes, blown films or fibers.

Finally, the invention also relates to pigments comprising one or more polymers and/or oligomers of the type described herein.

The novel polymers are particularly suitable for coating substrates, which can be organic or inorganic. The polymers and oligomers can be used, inter alia, for the production of a protective, aesthetically pleasing surface protection in the sense of an organic enamel which adheres well to metal surfaces.

Examples of inorganic substrates are metals, oxidic and nonoxidic ceramics, natural and synthetic minerals, such as mica and ultramarine, and carbon papers and carbon films. In the case of the two latter substrates, double-sided coating is advantageous, in particular if they are subsequently, after grinding to give flakes or pigments, applied to a silvered substrate.

Examples of organic substrates are, inter alia, films made from other polymers. Such films can be oriented or unoriented. Both axially oriented and biaxially oriented films are known. All these film types can also already have a layer structure consisting of at least two layers. Also interesting are films which, through their multilayer laminate or multilayer extrudate structure consisting of layers of different refractive index, already exhibit an iridescent effect per se.

It is also possible to coat inorganic substrates which have an internal layer structure, as in the case of specific interference pigments having at least one metallic layer and at least one dielectric layer.

The substrates can also be given a sheet-like structure, for example as quasi-continuous films or microscopically small flakes or pigments, or can alternatively be more or less two-dimensional, for example wires or spheres, which can also have elliptical or varying or irregular cross sections in one or more dimensions. The novel pigments exhibit virtually all the effects described in the literature (D2), which is mentioned below in greater detail, and are suitable for the same uses without exhibiting the disadvantages thereof, being based on completely different chemical structures.

The pigments exhibit a color which depends on the viewing angle, in the simplest case the color being based only on an interference effect which results in reflection and not in the absorption which is otherwise usual for normal pigments.

In another embodiment, one or more dyes or pigments which act by absorption may additionally be present, it being possible for at least one of the dyes to be chemically bonded to the novel polymers, for example in the sense of reactive dyes, or—if bifunctional, for example perylenetetracarboxylic anhydride—also as a building block of the polymer itself. For absorbent pigments, simple mechanical mixing is the preferred embodiment. An advantageous example is gas black, which absorbs the non-reflected part of the light from the cholesteric pigment and thus renders the otherwise useful dark primer coat at least partially superfluous.

Other specific pigment mixtures are those obtained by (mechanical) mixing of novel pigments having different selective reflection with one another. These mixtures enable virtually all color modifications.

A particular form of coating can be applications as light filters in window panes, visors and sunglasses.

There are many ways of producing flakes and pigments from the novel polymers:

atomization, coating, utilization of the skin effect (see, for example, J. Appl. Polym. Sci. 1995, 55, 1117), filing, abrading, ultrasound, intimate mixing as a thermoplastic with layer-forming substances (graphite, $MoS_2$ or phyllosilicates) and grinding to give platelets coated on one side.

Shaped articles, such as films, tapes and fibers, which may also contain other materials, are obtainable, inter alia, by coextrusion.

Besides other polymers, the coextrusion can also be carried out with inorganic materials, in particular with metal or metal-alloy wires.

Fibers can be used to produce sheet-like structures, for example nonwovens, laid fabrics and woven fabrics, which are suitable for technical, decorative, textile and, owing to the special optical phenomena, also for clothing purposes.

Preference is given to processing via the melt, such as extrusion (including extrusion blow molding) and injection molding, to give two- and three-dimensional structures. Examples of injection-molded articles are optical and lighting components, such as filters and planar or curved mirrors, in particular headlamp reflectors (automobiles to domestic articles). The metallization, which is otherwise conventional and complex, can also be either entirely or at least partly omitted here.

Examples of extruded articles are rods, profiles and pipes which have a luxury appearance.

A possible embodiment is utilization of the so-called skin effects, ie. a heterogeneous polymer blend is thermoplastically shaped in such a way that the novel polymers—probably without wishing to be bound to a specific theory—owing to their rheology are located on the surface of the shaped article. The core is consequently formed by at least one non-LCP phase.

Flakes and pigment particles are used in surface coatings, such as paints, for example for automobiles, in leisure articles or cosmetic articles.

German patent application 195 38 00.7, whose priority is claimed by the present application, and the abstract of the present application are expressly incorporated herein by way of reference; they are considered part of this application by way of reference:

The working examples below serve to illustrate the subject-matter of the invention:

EXAMPLE 1

75.25 g (0.4 mol) of 2-hydroxy-6-naphthoic acid, 55.25 g (0.4 mol) of 4-hydroxybenzoic acid, 16.61 g (0.1 mol) of terephthalic acid and 14.61 g (0.1 mol) of 1,4:3,6-dianhydro-D-sorbitol (isosorbide) are mixed with 104.6 g (1.025 mol) of acetic anhydride, and a gentle stream of nitrogen is passed through the mixture. The mixture is heated to 140° C. over the course of 15 minutes, and this temperature is then maintained for 20 minutes. The temperature is then increased to 320° C. over the course of 150 minutes. Acetic acid starts to distill off from the mixture from about 220° C. When the temperature of 320° C. is reached, the mixture is stirred at this temperature for a further 60 minutes. The nitrogen stream is then terminated and a vacuum is applied. The mixture is stirred under reduced pressure (about 5 mbar) for a further 30 minutes and then aerated with nitrogen, and the flask containing the polymer is cooled in an ice bath. After cooling, the polymer is isolated.

The polymer has a bright cobalt-blue color. The color appears even during condensation under reduced pressure and is also retained after cooling.

m.p.=170° C.

intrinsic viscosity=0.26 dug (measured in pentafluorophenol/hexafluoroisopropanol)

EXAMPLE 2

18.81 g (0.1 mol) of 2-hydroxy-6-naphthoic acid, 41.43 g (0.3 mol) of 4-hydroxybenzoic acid, 49.83 g (0.3 mol) of terephthalic acid, 18.61 g (0.1 mol) of 4,4'-dihydroxybiphenyl, 11.01 g (0.1 mol) of hydroquinone and 14.61 g (0.1 mol) of 1,4:3,6-dianhydro-D-sorbitol (isosorbide) are mixed with 104.6 g (1.025 mol) of acetic anhydride, and a gentle stream of nitrogen is passed through the mixture. The mixture is heated to 140° C. over the course of 15 minutes, and this temperature is then maintained for 20 minutes. The temperature is then increased to 320° C. over the course of 150 minutes. Acetic acid starts to distill off from the mixture from about 220° C. When the temperature of 320° C. is reached, the mixture is stirred at this temperature for a further 60 minutes. The nitrogen stream is then terminated and a vacuum is applied. The mixture is stirred under reduced pressure (about 5 mbar) for a further 30 minutes and then aerated with nitrogen, and the flask containing the polymer is cooled in an ice bath. After cooling, the polymer is isolated.

During the condensation under reduced pressure, the reaction mixture takes on a brightly luminescent, green and blue shimmering color. After cooling, the polymer has a biege-brown color. On re-heating of the sample to at least 280° C. and spreading to form a film, the bright green-blue sheen is again obtained. If the polymer is quenched directly from the melt, for example by introducing the film into water, the bright color is retained. When viewed perpendicularly, the film appears green. On angling of the film, the green shade becomes bluer and bluer with increasing angle. When viewed tangentially, the film appears dark blue to violet.

m.p.=260° C.

intrinsic viscosity=0.12 dl/g (measured in pentafluorophenol/hexfluoroisopropanol)

EXAMPLE 3

37.62 g (0.2 mol) of 2-hydroxy-6-naphthoic acid, 96.68 g (0.7 mol) of 4-hydroxybenzoic acid, 8.31 g (0.05 mol) of terephthalic acid and 7.31 g (0.05 mol) of 1,4:3,6-dianhydro-D-sorbitol (isosorbide) are mixed with 104.6 g (1.025 mol) of acetic anhydride, and a gentle stream of nitrogen is passed through the mixture. The mixture is heated to 140° C. over the course of 15 minutes, and this temperature is then maintained for 20 minutes. The temperature is then increased to 320° C. over the course of 150 minutes. Acetic acid starts to distill off from the mixture from about 220° C. When the temperature of 320° C. is reached, the mixture is stirred at this temperature for a further 60 minutes. The nitrogen stream is then terminated and a vacuum is applied. The mixture is stirred under reduced pressure (about 5 mbar) for a further 30 minutes and then aerated with nitrogen, and the flask containing the polymer is cooled in an ice bath. After cooling, the polymer is isolated.

During the condensation under reduced pressure, the reaction mixture takes on a blue shimmering color, but this is lost on slow cooling and becomes a pale beige shade. On re-heating of the sample to at least 280° C. and spreading to form a film, the bright blue sheen, which can be fixed by quenching the sample in cold water, is again obtained. When viewed perpendicularly, the sample appears blue, but dark violet when viewed at an oblique angle.

m.p.=250° C.

EXAMPLE 4

282.18 g (1.5 mol) of 2-hydroxy-6-naphthoic acid, 345.3 g (2.5 mol) of 4-hydroxybenzoic acid, 86.09 g (0.5 mol) of cyclohexane-1,4-dicarboxylic acid, 27.93 g (0.15 mol) of 4,4'-dihydroxybiphenyl and 51.15 g (0.35 mol) of 1,4:3,6-dianhydro-D-sorbitol (isosorbide) are mixed with 528.8 g (5.11 mol) of acetic anhydride, and a gentle stream of nitrogen is passed through the mixture. The mixture is heated to 140° C. over the course of 15 minutes, and this temperature is then maintained for 20 minutes. The temperature is then increased to 320° C. over the course of 150 minutes. Acetic acid starts to distill off from the mixture from about 220° C. When the temperature of 320° C. is reached, the mixture is stirred at this temperature for a further 60 minutes. The nitrogen stream is then terminated and a vacuum is applied. The mixture is stirred under reduced pressure (about 5 mbar) for a further 30 minutes and then aerated with nitrogen, and the flask containing the polymer is cooled in an ice bath. After cooling, the polymer is isolated.

When viewed perpendicularly, the polymer has a bright greenish-gold color. The color appears even during condensation under reduced pressure and is also retained after cooling.

EXAMPLE 5

169.31 g (0.9 mol) of 2-hydroxy-6-naphthoic acid, 211.32 g (1.53 mol) of 4-hydroxybenzoic acid, 44.86 g (0.27 mol) of terephthalic acid, 9.25 g (0.06 mol) of 3,5- dihydroxybenzoic acid and 35.07 g (0.24 mol) of 1,4:3,6-dianhydro-D-sorbitol (isosorbide) are mixed with 313.8 g (3.075 mol) of acetic anhydride, and a gentle stream of nitrogen is passed through the mixture. The mixture is heated to 140° C. over the course of 15 minutes, and this temperature is then maintained for 20 minutes. The temperature is then increased to 330° C. over the course of 150 minutes. Acetic acid starts to distill off from the mixture from about 220° C. When the temperature of 330° C. is reached, the mixture is stirred at this temperature for a further 15 minutes. The nitrogen stream is then terminated and a vacuum is applied. The mixture is stirred under reduced pressure (about 5 mbar) for a further 45 minutes and then aerated with nitrogen, and the flask containing the polymer is cooled in an ice bath. After cooling, the polymer is isolated.

The polymer has a silver-blue color. The color appears even during condensation under reduced pressure and is also retained after cooling.

intrinsic viscosity=1.17 dl/g
(measured in pentafluorophenol/hexafluoroisopropanol 1:1)

EXAMPLE 6

112.87 g (0.6 mol) of 2-hydroxy-6-naphthoic acid, 138.12 g (1 mol) of 4-hydroxybenzoic acid, 43.23 g (0.2 mol) of naphthalene-2,6-dicarboxylic acid, 13.96 g (0.075 mol) of 4,4'-dihydroxybiphenyl and 18.26 g (0.125 mol) of 1,4:3,6-dianhydro-D-sorbitol (isosorbide) are mixed with 209.71 g (2.05 mol) of acetic anhydride, and a gentle stream of nitrogen is passed through the mixture. The mixture is heated to 140° C. over the course of 15 minutes, and this temperature is then maintained for 20 minutes. The temperature is then increased to 330° C. over the course of 150 minutes. Acetic acid starts to distill off from the mixture from about 220° C. When the temperature of 330° C. is reached, the mixture is stirred at this temperature for a further 20 minutes. The nitrogen stream is then terminated and a vacuum is applied. The mixture is stirred under reduced pressure (7 mbar) for a further 40 minutes and then aerated with nitrogen, and the flask containing the polymer is cooled in an ice bath. After cooling, the polymer is isolated.

The polymer has a very bright, greenish yellow-gold color. The color appears even during condensation under reduced pressure and is also retained after cooling.

EXAMPLE 7

56.43 g (0.3 mol) of 2-hydroxy-6-naphthoic acid, 69.06 g (0.5 mol) of 4-hydroxybenzoic acid, 16.61 g (0.1 mol) of terephthalic acid and 14.61 g of 1,4:3,6-dianhydro-D-mannitol (isomannitol) are mixed with 104.6 g (1.025 mol) of acetic anhydride, and a gentle stream of nitrogen is passed through the mixture. The mixture is heated to 140° C. over the course of 15 minutes, and this temperature is then maintained for 20 minutes. The temperature is then increased to 325° C. over the course of 150 minutes. Acetic acid starts to distill off from the mixture from about 220° C. When the temperature of 325° C. is reached, the mixture is stirred at this temperature for a further 30 minutes. The nitrogen stream is then terminated and a vacuum is applied. The mixture is stirred under reduced pressure (3 mbar) for a further 30 minutes and then aerated with nitrogen, and the flask containing the polymer is cooled in an ice bath. After cooling, the polymer is isolated.

The polymer has a bright turquoise-blue color. The color appears even during condensation under reduced pressure and is also retained after cooling.

EXAMPLE 8

47.03 g (0.25 mol) of 2-hydroxy-6-naphthoic acid, 34.53 9 (0.25 mol) of 4-hydroxybenzoic acid, 41.53 g (0.25 mol) of terephthalic acid, 2.16 g (0.02 mol) of p-phenylenediamine, 12.72 g (0.06 mol) of dimethylbenzidine, 4.51 g (0.02 mol) of diaminobenzimidazole and 21.92 g (0.15 mol) of 1,4:3,6-dianhydro-D-sorbitol (isosorbide) are mixed with 104.6 g (1.025 mol) of acetic anhydride, and a gentle stream of nitrogen is passed through the mixture. The mixture is heated to 140° C. over the course of 15 minutes, and this temperature is then maintained for 20 minutes. The temperature is then increased to 320° C. over the course of 150 minutes. Acetic acid starts to distill off from the mixture from about 220° C. When the temperature of 320° C. is reached, the mixture is stirred at this temperature for a further 60 minutes. The nitrogen stream is then terminated and a vacuum is applied. The mixture is stirred under reduced pressure (about 5 mbar) for a further 30 minutes and then aerated with nitrogen, and the flask containing the polymer is cooled in an ice bath. After cooling, the polymer is isolated.

The polymer has a greenish blue color. The color appears even during condensation under reduced pressure and is also retained after cooling. The material is very brittle.

Further advantages and embodiments of the invention arise from the patent claims below.

What is claimed is:

1. A polymer or oligomer which forms cholesteric phases, essentially consisting, as molecular building blocks, of
   A. at least one bifunctional chiral molecular building block which contains at least one cyclic structural element other than a monosubstituted p-phenylene group;
   B. at least on bifunctional achiral or racemic molecular building block which contains at least one cyclic structural element containing at least four ring members; and
   C. at least cyclic bifunctional achiral or chiral molecular building block which is different from the molecular building blocks A and B actually employed,
   where the molecular building blocks are linked by ester groups containing (C=O)= and O—C=O, carbonic esters containing O—(C=O)—O, amide groups CONH, N-substituted amide CONR, cyclic imide containing six ring members, azomethines CH=N and CR=N, where the radical R is identical or different and is $C_1$–$C_{22}$-alkyl, -aryl, or -aralkyl,
   with the proviso that the molecular building block A is not derived exclusively from camphoric acid.

2. A polymer as claimed in claim 1, which comprises from 0.01 to 50 mol % of the molecular building block A, based on the total number of moles of molecular building blocks A, B and C.

3. A polymer as claimed in claim 1, which has a solution viscosity (Staudinger index) of between 0.01 and 2.0 dl/g.

4. A polymer as claimed in claim 3, which has a solution viscosity of between >0.1 and <1.0 dl/g.

5. A blend or composite comprising one or more polymers and/or oligomers as claimed in claim 1.

6. A shaped structure comprising one or more polymers and/or oligomers as claimed in claim 1.

7. A shaped structure as claimed in claim 6, selected from the group consisting of injection-molded articles, extruded profiles and pipes, films, tapes, blown films, and fibers.

8. A pigment comprising one or more polymers or oligomers as claimed in claim 1.

9. A process for the preparation of polymers and oligomers which form cholesteric phases, in which at least one bifunctional achiral or racemic molecular building block B, which contains at least one cyclic structural element containing at least four ring members, and at least one bifunctional cyclic chiral or achiral molecular building block C, where the molecular building blocks B and C together form LCPs, are reacted with at least one bifunctional chiral molecular building block A which contains at least one cyclic structural element other than a monosubstituted p-phenylene group.

10. The process as claimed in claim 9, wherein, in a standard formulation for nematic main-chain LCPs, from 0.1 to 50 mol % are replaced by one or more monomers corresponding to the molecular building blocks A.

11. The process as claimed in claim 9, wherein the monomers corresponding to the molecular building blocks A, B and C are polycondensed to obtain the polymer or oligomer.

12. A polymer or oligomer as claimed in claim 1, wherein R comprises an acyclic radical that is linear or branched.

13. A polymer or oligomer as claimed in claim 1, wherein R is a branched acyclic radical, linear acyclic radical or cyclic radical and contains at least one heteroatom other than C and H.

14. A polymer or oligomer as claimed in claim 13, wherein R is substituted.

15. A polymer or oligomer as claimed in claim 14, wherein R is heteroatom-substituted.

16. A polymer or oligomer as claimed in claim 14, wherein the substituent carries one or more halogens.

17. The process as claimed in claim 9, wherein the molecular building block A is not derived exclusively from camphoric acid.

18. A colored LCP comprising a polymer or oligomer as claimed in claim 1.

19. Cholesteric phases useful for coating surfaces comprising a polymer or oligomer as claimed in claim 1.

20. An article comprising a polymer or oligomer as claimed in claim 1, wherein the article is selected from the group consisting of injection-molded articles, extruded profiles and pipes, films, tapes, blown films or fibers.

* * * * *